Figure 1:
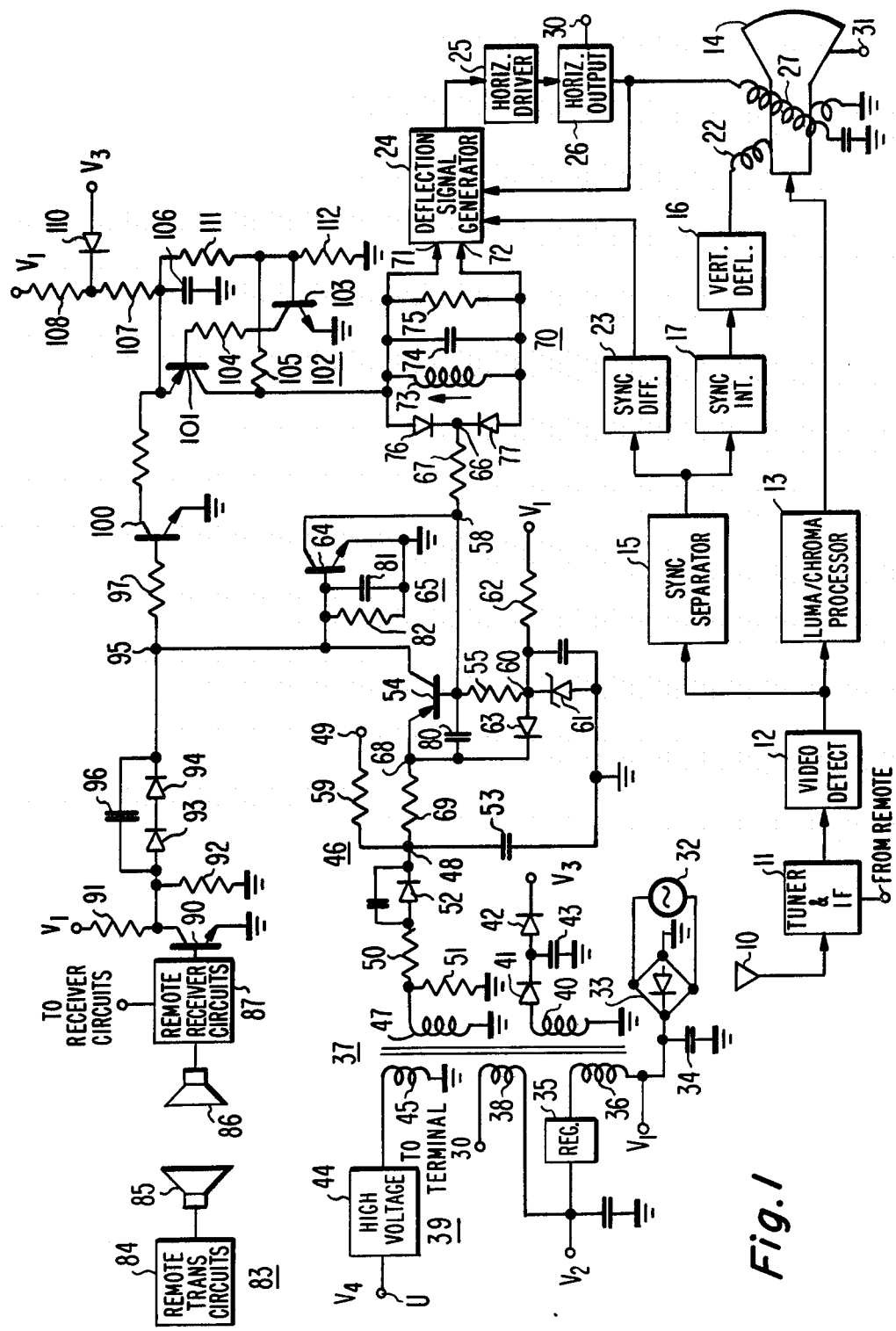

United States Patent [19]

Kliebphipat et al.

[11] 4,435,731

[45] Mar. 6, 1984

[54] TELEVISION RECEIVER DISABLING CIRCUIT

[75] Inventors: Ravadee Kliebphipat; Ronald E. Fernsler, both of Indianapolis; James E. Hicks, New Palestine, all of Ind.

[73] Assignee: RCA Corporation, New York, N.Y.

[21] Appl. No.: 298,389

[22] Filed: Sep. 1, 1981

[51] Int. Cl.³ .......................... H04N 5/44; H01J 29/70
[52] U.S. Cl. ..................................... 358/243; 358/190; 358/106; 315/411; 455/343
[58] Field of Search ...................... 358/243, 190, 194.1; 455/200, 217, 234, 343, 355; 315/408, 411; 328/8, 9

[56] References Cited

U.S. PATENT DOCUMENTS

| | | | |
|---|---|---|---|
| 3,858,084 | 12/1974 | Manners | 315/387 |
| 3,881,135 | 4/1975 | Dietz | 315/411 |
| 3,898,522 | 8/1975 | Klein et al. | 315/379 |
| 4,024,577 | 5/1977 | Diethelm | 358/190 |
| 4,042,858 | 8/1977 | Collette et al. | 315/408 |
| 4,045,742 | 8/1977 | Meehan et al. | 328/9 |
| 4,074,323 | 2/1978 | Griffey | 358/243 |
| 4,147,964 | 4/1979 | Luz | 358/243 |
| 4,234,829 | 11/1980 | Willis | 358/243 |
| 4,335,335 | 6/1982 | Willis | 358/243 |
| 4,343,028 | 8/1982 | Hicks | 358/243 |

*Primary Examiner*—Tommy P. Chin
*Attorney, Agent, or Firm*—Paul J. Rasmussen; William H. Meise; Scott J. Stevens

[57] ABSTRACT

A television receiver incorporates a common mechanism for disabling the receiver via the high voltage or fault protection circuit and via the remote control during normal operation. In one embodiment, the protection circuit is energized by the remote control in order to turn the receiver off. The remote control is used to reset the protection circuit in order to turn the receiver on.

13 Claims, 2 Drawing Figures

TELEVISION RECEIVER DISABLING CIRCUIT

This invention relates to a television receiver which provides an interface between a remote control and the receiver X-ray protection circuitry.

The picture tube or kinescope of a television receiver produces one or more electron beams which are accelerated by a high voltage potential and are caused to impinge upon a phosphor display screen. Under certain conditions, e.g., excessive high voltage or electron beam current, x-radiation may be emitted by the receiver. In order to protect the viewer from these potentially harmful x-rays, the picture tube high voltage and beam current levels must be kept within prescribed limits. High voltage sensing circuitry monitors the high voltage level and interacts with some form of protection circuit if a potentially unsafe high voltage level is reached. This protection circuitry may be of the type which scrambles the television picture so that the viewer turns off the set, but does not affect the high voltage level while the set is turned on.

Another type of protection circuitry disables a portion of the television receiver in order to actually reduce the high voltage level. Such a circuit is disclosed in a copending application, Ser. No. 216,338, entitled "Television Receiver High Voltage Protection Circuit", filed in the names of A. R. Balaban et al. The subject circuit of that application disables a horizontal raterelated oscillator which causes a termination of horizontal flyback pulses. This in turn causes the high voltage, which is derived from the flyback pulses, to decrease.

Protection circuits of the previously described receiver disabling type may comprise some form of latch circuit which maintains the receiver in a shutdown mode by means of a latch sustaining current until the protection circuit is reset. Resetting of the circuit may be accomplished by removing power from the latch. In some receivers this may be possible via the main on/off control, but other receivers may require that the AC line cord be temporarily disconnected from the AC source. This procedure may be annoying and cumbersome, however, if the protection circuit is subject to frequent false or nuisance tripping.

Television receivers which incorporate remote control circuitry must provide some means by which the receiver may be turned on and off via the remote control unit. One technique utilizes a mechanical relay which is powered by the AC line whenever the receiver is plugged in. Power is applied to the receiver operating circuits via the relay when the on-control of the remote used is pressed. Power dissipation is high with this method, however.

Another technique, disclosed in U.S. Pat. No. 4,234,829—Willis, controlled the operation of the voltage regulator control circuit in order to turn the set on and off with the remote control unit. Some receivers, however, include integrated circuits which incorporate many of the receiver elements which were previously discrete components or circuits, including control circuitry for the voltage regulator. Integration of the regulator control circuitry therefore may render the previously described turn-on/off mechanism unusable unless the turn on-turn off circuitry is also integrated. It is therefore desirable to provide some means for turning a receiver on and off via a remote control unit where previously-utilized conventional techniques are unavailable or undesirable.

It is also desirable to provide some means for interfacing the remote control with the high voltage shutdown protection circuit in order to use the remote control as a means for resetting the protection circuit if false or nuisance tripping should occur.

The present invention is directed to a television receiver having a high voltage protection circuit which turns off the receiver during the presence of an overvoltage condition via a particular disabling mechanism. Remote control circuitry is provided which is responsive to remote command for turning off the receiver via the same disabling mechanism as is used by the protection circuit. The remote interfaces with the protection circuit in order to allow the remote control to reset the protection circuit. In one embodiment, the remote control energizes the protection circuit shutdown mechanism as a means for turning the receiver off. The protection circuit is therefore exercised each time the remote control is operated.

In accordance with the present invention a television receiver disabling circuit comprises means for disabling the receiver when the disabling means is energized and means for detecting a receiver fault condition. First means are coupled to the fault detecting means for energizing the disabling means in the presence of a receiver fault condition. The first means incorporates a latch for maintaining the disabling means in an energized state when the latch is set. Means provide receiver on and off command signals. Second means coupled to the disabling means are responsive to one of the command signals for energizing the disabling means. The second means incorporates means coupled to the first means for resetting the latch in response to one of the command signals when the latch is set.

Figure 2:
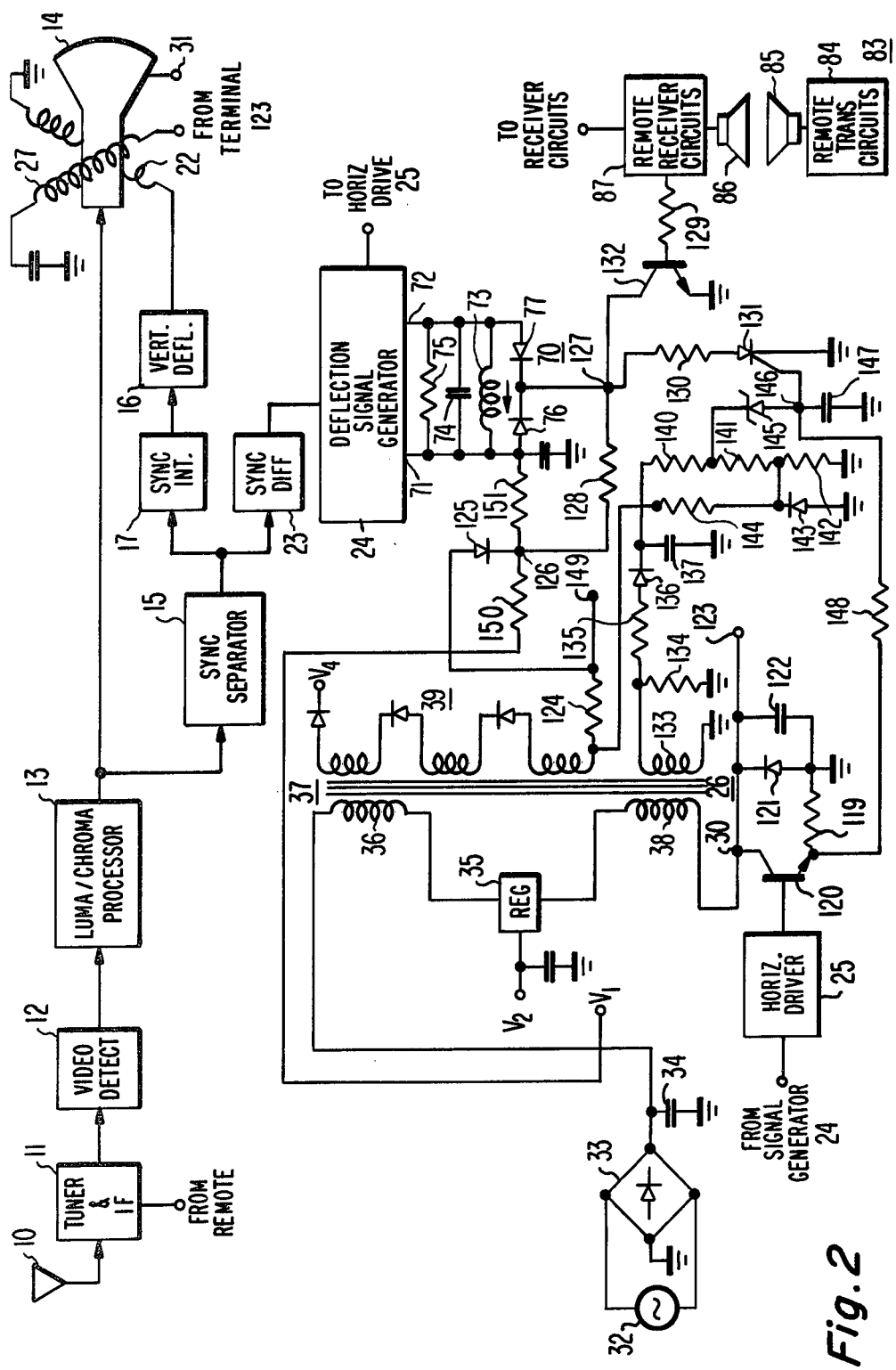

In the accompanying drawing,

FIG. 1 illustrates a schematic and block diagram of a television receiver incorporating a disabling circuit in accordance with one embodiment of the present invention; and FIG. 2 is a schematic and block diagram of a television receiver incorporating a disabling circuit in accordance with a second embodiment of the present invention.

The television receiver of FIG. 1 includes an antenna 10 which applies radio frequency signals to the tuner and intermediate frequency circuitry 11 of the receiver. I.F. signals are applied to a video detector 12 which produces a composite video signal. The video information of the composite video signal is processed by luminance and chrominance processing circuitry 13, which applies video drive signals to a kinescope 14.

The composite video signal is also supplied to a sync separator 15, which separates the horizontal and vertical sync signals from the video information. This composite sync signal is applied to a vertical deflection circuit 16 by way of a sync integrator 17. The sync integrator 17 supplies vertical sync pulses to the vertical deflection circuit 16 to establish the timing of vertical deflection waveforms which are applied to a vertical deflection winding 22 on the kinescope.

A sync differentiator 23 separates horizontal sync information from the composite sync signal and provides horizontal sync signals to a deflection signal generator 24. Deflection signal generator 24 comprises an integrated circuit which incorporates a high frequency oscillator and countdown circuits for providing horizontal rate drive signals to a horizontal driver 25 from a high frequency signal generated by the oscillator. This high frequency signal, nominally sixteen times the horizontal rate (252 KHz) is produced by means which will be described later. Deflection signal generator 24 may also include one or more phase-locked loops to provide frequency and phase control between incoming synchronizing pulses and the generated deflection drive signals.

The horizontal driver circuit 25 supplies horizontal deflection drive waveforms to a horizontal deflection output circuit 26. Output circuit 26 may, for example, include an output transistor coupled in parallel with a damper diode and a retrace capacitor. Output circuit 26 supplies deflection current to horizontal deflection winding 27 on the kinescope 14, and develops flyback pulses which are applied to deflection signal generator 24.

These flyback pulses are utilized by the previously described frequency and phase control loops of deflection signal generator 24. Power for horizontal output circuit 26 is applied via a terminal 30. The high voltage anode or ultor potential, of the order of 27 kV, is applied to kinescope 14 via a terminal 31.

An AC line source 32 provides a voltage which is rectified by a diode bridge 33 and charges a filter capacitor 34 to develop a raw or unregulated voltage, designated $V_1$. This raw voltage $V_1$ is applied to an input of a voltage regulator circuit 35 via a primary winding 36 of a transformer 37. Control of regulator 35 may be provided via control pulses from signal generator 24, for example via a circuit connection (not shown). The output of regulator circuit 35 is a regulated voltage, designated $V_2$, which is applied by way of a primary winding 38 of transformer 37 to generate a voltage which coupled to terminal 30 in order to energize horizontal output circuit 26. Flyback pulses generated by horizontal output circuit 26 therefore energize the windings of transformer 37 via winding 38.

The receiver of FIG. 1 also includes a source of voltage designated $V_3$ which is derived via a winding 40 of transformer 37, diodes 41 and 42 and a capacitor 43. The voltage $V_3$ may be used to power deflection signal generator 24, for example.

Horizontal flyback pulses from horizontal output circuit 26 also energize a high voltage generator 39. High voltage generator 39 also comprises a high voltage circuit 44 which is coupled to winding 45 of high voltage transformer 37. High voltage circuit 44 rectifies and filters the stepped up flyback pulses from winding 45 to produce a high voltage anode or ultor potential, designated $V_4$, at an ultor terminal U, which is applied to terminal 31 of kinescope 14. High voltage generator 39 may also comprise a series of windings and rectifier diodes such as that shown in FIG. 2.

As previously described, deflection signal generator 24 includes a high frequency voltage controlled oscillator that develops an alternating oscillator output signal. The frequency of the oscillator output signal is determined by the resonant frequency of an inductive-capacitive, LC resonant tank network 70 coupled across input terminals 71 and 72 of deflection signal generator 24. LC resonant tank network 70 comprises the parallel arrangement of an inductor 73, a capacitor 74, and a resistor 75. The resistance of resistor 75 controls the Q of tank network 70 and aids in establishing the frequency range over which the oscillator may be controlled. Resistor 75 also substantially determines the peak-to-peak voltage across tank network 70 to provide frequency stability of operation.

The oscillator of deflection signal generator 24 excites resonant tank network 70 into sustained, regenerative oscillation to develop an alternating polarity voltage across input terminals 71 and 72. The oscillator of signal generator 24 amplifies and waveshapes the input voltage waveform generated by tank circuit 70 to produce an alternating high frequency signal which is applied to the countdown circuits of signal generator 24. The resonant frequency of tank network 70, and thus the frequency of the alternating high frequency signal, may be selected as a multiple of the horizontal deflection frequency, illustratively $16f_H$, as previously described.

The television receiver shown in FIG. 1 includes a fault detecting means comprising a high voltage protection circuit 46 of a type such as that described in U.S. patent application Ser. No. 216,338, filed in the names of A. R. Balaban et al, herein incorporated by reference. Protection circuit 46 comprises a high voltage sensing winding 47 of transformer 37. Additional fault detecting and protection circuits may be used, such as excessive beam current sensing circuits.

Retrace pulse voltage, appearing across winding 47 by way of winding 38, is applied via resistors 50 and 51 to a rectifying diode 52 and a filter capacitor 53 in order to develop a DC voltage representative of the ultor voltage. This voltage is applied to a junction 48. Junction 48 is coupled to a terminal 49 via a resistor 59 and to a junction 68 via a resistor 69.

The emitter input terminal of a comparator transistor 54 is coupled to junction 68. The base input electrode of transistor 54 is coupled through a resistor 55 to a source of reference voltage developed at a terminal 60 by a zener diode 61. Bias current for zener diode 61 is obtained from the unregulated input voltage $V_1$ through a resistor 62. A diode 63 is coupled between reference voltage terminal 60 and the emitter of comparator transistor 54, with the cathode of diode 63 being coupled to the emitter.

Comparator transistor 54 and a complementary conductivity type transistor 64 are coupled together to form a latch circuit 65. An output terminal 58 of latch circuit 65, at the collector of transistor 65 is coupled to a junction terminal 66 through a resistor 67. A switching element comprises diodes 76 and 77 which are poled so that the like functioning cathode electrodes of the diodes are coupled together at junction terminal 66.

During normal television display system operation, diode 63 of high voltage protection circuit 46 is conducting and comparator transistor 54 is cut off, thereby maintaining disabling latch circuit 65 deactivated. If a fault condition occurs during the operation of the receiver wherein, for example, the ultor voltage tends to increase to excessive levels, the ultor voltage representative voltages at junction 48 increases enough to reverse bias diode 63 and forward bias comparator transistor 54 into conduction. A capacitor 80 is coupled across diode 63 to prevent transient voltage at the emitter input electrode of transistor 54 from unnecessarily turning on the transistor. When transistor 54 is turned on, base current is supplied to transistor 64 to turn it on. Disabling latch circuit 65 is activated by the regeneratively maintained conduction of transistors 54 and 64. A filter network comprising a capacitor 81 and a resistor 82 is coupled to the base of transistor 64 to prevent activating latch circuit 65 during transitory picture tube arcing conditions.

When transistor 64 is switched into conduction and disabling latch circuit 65 is activated, a disabling signal is developed at latch output terminal 58, the disabling signal being the ground potential developed at the output terminal when transistor 64 is switched on. With terminal 58 at ground potential, diodes 76 and 77 become forward biased and conduct a small amount of current from terminal 66 through resistor 67. Sustaining latch current for latch 65 is provided from the source of voltage $V_1$ through resistors 62 and 55.

With diodes 76 and 77 simultaneously conducting, substantially the same voltage is being developed across input terminals 71 and 72, thereby AC short-circuiting tank network 70. By short-circuiting tank network 70, the altenating input voltage to deflection signal generator 24 is removed, thereby disabling the oscillator of signal generator 24 and removing the oscillator alternating high frequency output signal. When the receiver shuts down and the flyback-derived voltages, including the voltage at terminal 68, disappear, transistors 54 and 64 of latch 65 remain regeneratively conducting due to latch current from unregulated voltage source $V_1$. Terminals 49 and 68 may be connected together to test the operation of protection circuit 46. Connection of terminals 49 and 68 forms a parallel combination of resistors 59 and 69, lowering the circuit resistance sufficient to turn on transistor 54 with a normal high voltage level.

Because the output signal of the oscillator within deflection signal generator 24 serves as the clock input to the frequency countdown circuits of signal generator 24, removal of the oscillator output signal via disabling of tank circuit 70 will result in the termination of horizontal rate drive pulses from deflection signal generator 24. With deflection signal generator 24 disabled, horizontal output circuit 26 is also disabled, and horizontal retrace pulses are not developed. High voltage generator circuits 44 are therefore also disabled, providing protection against the development of excessive ultor voltage.

The television receiver shown in the drawing also is operable via a remote control unit 83. Remote control unit 83 comprises remote transmitter circuits 84 and a transducer 85. Transmitter circuits 84 provide receiver command signals, which may include the desired function controls, such as on/off, volume up/down, and channel selection, along with the necessary encoding circuitry. Transducer 85 may be of a known, conventional type, such as ultrasonic or infrared.

The receiver chassis incorporates a remote control receiving transducer 86 coupled to remote receiving circuits 87. Transducer 86 receives the command signals produced by transducer 85, while receiving circuits 87 decode the signals from transducer 86. The decoded remote signals are indicated as being applied to appropriate receiver circuits, such as a tuner (not shown) or audio circuits (not shown).

Remote receiver circuit 87 also provides command signals which are used to control the on and off state of the television receiver. The decoder turn on/turn off signal is applied from remote receiver circuits 87 to the base of a transistor 90. The collector of transistor 90 is coupled through a resistor 91 to the unregulated voltage $V_1$, through a resistor 92 to ground, and through series connected diodes 93 and 94 to a junction 95. A capacitor 96 is connected across diodes 93 and 94. Junction 95 is coupled to the base of transistor 64 and through a current limiting resistor 97 to the base of a transistor 100. The collector of transistor 100 is connected to the emitter of a transistor 101 which comprises part of a receiver start-up circuit 102, such as described in a patent application entitled "Horizontal Deflection Circuit with a Start-Up Power Supply," Ser. No. 276,305 filed in the name of D. W. Luz. Start-up circuit 102 provides a start-up voltage to energize deflection signal generator 24. Circuit 102 comprises transistor 101 and a transistor 103, with the collector of transistor 103 coupled through a resistor 104 to the base of transistor 101. The collector of transistor 101 is regeneratively coupled back to the base of transistor 103 through a resistor 105. The collector of transistor 101 is also coupled to terminal 71 of deflection signal generator 24. The emitter of transistor 101 is coupled to a first end of a capacitor 106, through resistors 107 and 108 to voltage $V_1$, and through resistor 107 and a diode 110 to voltage $V_3$. The first end of capacitor 106 is coupled through resistors 111 and 112 to ground. The junction between resistor 111 and 112 is coupled to the base of transistor 103. The second end of capacitor 106 is grounded.

When a receiver "ON" signal is received by transducer 86 and remote receiver circuit 87, receiver circuit 87 drives the base of transistor 90, turning transistor 90 on. Conduction of transistor 90 brings its collector voltage close to ground, maintaining transistor 100 off. At this time transistors 54 and 64 are also not conducting. Start-up circuit 102 will therefore turn on the set in the following manner. The unregulated voltage $V_1$, present at all times while the set is connected to the AC line voltage source, charges capacitor 106 through resistors 107 and 108. When the voltage on capacitor 106 reaches approximately 8 volts, the bias network comprising resistors 111 and 112 causes transistor 103 to turn on. Conduction of transistor 103 turns on transistor 101 which allows the voltage of capacitor 106 to be applied to terminal 71 of deflection signal generator 24. Deflection signal generator 24 therefore begins to operate, producing control signal for regulator 35, and deflection drive pulses to horizontal driver circuitry 25. This allows horizontal output circuit 26 to operate, generating flyback pulses which are used to produce the voltages necessary to sustain operation of the receiver. If the voltage on capacitor 106 decays to a predetermined level (e.g. 3 volts) before sufficient receiver operating voltage is achieved, transistors 101 and 103 turn off, allowing capacitor 106 to recharge. Start-up circuit 102 will continue to oscillate within the 3 volt-8 volt hysteresis until the receiver begins operating properly. At that time the source of voltage $V_3$ maintains start up circuit 102 outside its hysteresis and the receiver operates in its normal manner.

When remote circuit 87 senses a receiver "OFF" command, transistor 90 is turned off, allowing its collector voltage to rise to approximately 1.9 volts. This is sufficient to forward bias diodes 93 and 94, which will turn on transistor 64 of latch circuit 65. Conduction of transistor 64 turns on transistor 54 and sets or energizes latch 65. Conduction of transistor 64 also forward biases diodes 76 and 77. As previously described, tank circuit 70 becomes disabled, and the receiver shuts down. Transistors 54 and 64 will remain regeneratively latched on with latch sustaining current supplied by the source of unregulated voltage $V_1$, via resistors 62 and 55. Protection circuit 46 is therefore utilized by the remote control in order to turn off the receiver.

The collector voltage of transistor 90 in its off state also turns on transistor 100 which pulls the voltage of capacitor 106 below the lower hysteresis trip point of start-up circuit 102 (approximately 3 volts) so that start-up circuit will not oscillate while the set is turned off. Normal tripping of protection circuit 65 during an overvoltage condition will not prevent start-up circuit 102 from oscillating and attempting to turn on the receiver since transistor 100 remains off. If an alternate start-up circuit is used, transistor 100 may be unnecessary.

When the receiver is turned off via the remote control, the voltage drop across diodes 93 and 94 causes capacitor 96 to change to approximately 2 $V_{BE}$. When the set is subsequently turned on and transistor 90 becomes conductive, the voltage across capacitor 96 provides $-2\ V_{BE}$ across the base-emitter junction of transistor 64, which unlatches or resets latch circuit 65. The resetting of latch circuit 65 permits the receiver to turn on in its normal manner. The remote control can therefore be used to reset the protection circuit 46 merely by pressing the "OFF" and "ON" controls on the remote control unit 83. This feature is useful in the event the protection circuit 46 trips inadvertently since it allows resetting of the protection circuit without disconnecting the receiver from the AC line.

By utilizing protection circuit 46 to turn off the receiver, a check is made on the operability of the protection circuit each time the set is turned off. This provides a positive indication that the protection circuit is operating properly.

Referring to FIG. 2, a television receiver similar to that of FIG. 1 is shown which incorporates a different protection circuit and remote control interface than that illustrated with respect to FIG. 1. Elements in FIG. 2 having like counterparts in FIG. 1 will be designated with the same reference numberals.

In FIG. 2, horizontal output circuit 26 is illustrated as comprising a horizontal output transistor 120 in parallel with a damper diode 121 and a retrace capacitor 122. A resistor 119 is coupled between the emitter of transistor 120 and ground. The deflection signal from output circuit 26 is applied to horizontal deflection winding 27 and to deflection signal generator 24 via a terminal 123.

High voltage generator 39, as illustrated, comprises a plurality of voltage step-up windings and rectifier diodes in order to produce the high voltage $V_4$. The low voltage end of the windings of high voltage generator 39 is coupled through a resistor 124 to a voltage supply terminal 149 which is coupled to the source of voltage $V_3\ L$ (not shown). Voltage $V_3$ is produced via a winding of transformer 37 in a manner previously described with respect to the circuit of FIG. 1. The voltage $V_3$ is applied via a diode 125 to a junction 126. Junction 126 is coupled via a resistor 150 to the source of unregulated voltage $V_1$, to terminal 71 of deflection signal generator 24 via a resistor 151, and to a junction 127 via a resistor 128. Power for deflection signal generator 24 is therefore obtained from the source of voltage $V_1$, and is applied at terminal 71. Junction 127 of the collector of transistor 132 and the cathodes of diodes 76 and 77 is coupled to ground via a resistor 130 and the main current path of a switching element, illustrated as an SCR 131. The base of transistor 132 is coupled to remote receiver circuit 87 via a resistor 129. The emitter of transistor 132 is grounded.

Transformer 37 also incorporates a high voltage sense winding 133 which is coupled via resistors 134 and 135 and a rectifying diode 136 to a filter capacitor 137. The resultant rectified and filtered voltage is applied to a voltage divider including series-coupled resistors 140, 141 and 142. The junction between resistors 141 and 142 is coupled to the cathode of a diode 143 and via a resistor 144 to the low voltage end of the windings of high voltage generator 39. The anode of diode 143 is grounded.

The junction between resistors 140 and 141 is coupled to the cathode of a zener diode 145, which has its anode connected to a junction 146. Junction 146 is coupled to the gate of SCR 131, via a capacitor 147 to ground, and via a resistor 148 to the emitter of horizontal output transistor 120. The cathode of SCR 131 is coupled to ground.

The magnitude of the voltage induced in high voltage sense winding 133 of transformer 37 is proportional to the level of the high voltage $V_4$. The charge on capacitor 137 is therefore also proportional to the high voltage level. During normal receiver operation, the voltage on capacitor 137, when applied through the divider network of resistors 140, 141 and 142, is below the avalanche or breakdown voltage of zener diode 145. If the high voltage increases beyond a predetermined level, the voltage on capacitor 137 applied through resistors 140, 141 and 142 becomes sufficient to cause zener diode 145 to avalanche or breakdown. The breakdown of zener diode 145 causes SCR 131 to be biased on, whereby SCR 131 begins to conduct. Conduction of SCR 131 forward biases diodes 76 and 77, thereby shutting down the receiver in a manner such as that previously described with reference to FIG. 1. Anode current for SCR 131 is derived from the source of unregulated voltage $V_1$, which remains present as long as the receiver is connected to the AC line source.

The emitter voltage of transistor 120; i.e., the voltage across resistor 119, is proportional to the conduction current of transistor 120. This conduction current is determined by the current flow in winding 38 of transformer 37, which in turn is determined by the voltages and currents induced in the other windings of transformer 37. A malfunction or fault in any of the transformer-related power supplies or an excessive electron beam current, for example, may cause an increased current to flow in winding 38, thereby raising the emitter voltage of transistor 120. The value of resistor 119 is chosen so that a transformer related fault or excessive electron beam current causes the emitter voltage of transistor 120 to be raised sufficiently to cause SCR 131 to be gated on. SCR 131 then conducts, shutting down the receiver. The receiver of FIG. 2, therefore, incorporates a receiver-disabling protection circuit which is responsive to a number of receiver fault conditions, including excessive high voltage.

The voltage across resistor 119 is also proportional to the current at ultor terminal U, which is representative of beam current. Resistor 119 voltage will therefore influence the slope of the receiver high voltage isoexposure trip curve, thereby altering the characteristics of the trip curve in response to beam current level such that the high voltage trip point is determined by the beam current level. Resistor 144, coupled between the low voltage end of high voltage generator 39 windings and ground, cancels some of the adjustment of the isoexposure curve slope attributed to resistor 119 in order to accurately tailor the trip curve characteristics.

Diode 143 prevents the junction of resistors 141 and 142 from going below ground potential in the event the picture tube anode becomes shorted. If this were to occur, zener diode 145 would become forward biased and conduct, and the voltage developed across resistor 119 due to the resultant high current would not be able to gate SCR 131 on. Consequently, transistor 120 would be destroyed.

The receiver of FIG. 2 is also operable via a remote control. When a remote transmitter "OFF" signal is received and decoded by remote receiver circuit 87, an output pulse is provided which turns transistor 132 on. Conduction of transistor 132 forward biases diodes 76 and 77, disabling tank circuit 70 and shutting down the set. The operation of the remote control in turning off the receiver utilizes the same mechanism for disabling the receiver as that used by the protection circuit. A remote-control receiver "ON" command turns off transistor 132, reverse biasing diodes 76 and 77. A start-up circuit, internal to deflection signal generator 24 as described in a U.S. patent application entitled "Start-Up Circuit for a Power Supply", Ser. No. 261,361, filed in the names of A. R. Balaban and S. A. Steckler and herein incorporated by reference, then becomes operative in order to turn the receiver on.

When the protection circuit disables the receiver via conduction of SCR 131, anode current for SCR 131 is supplied by the source of voltage $V_1$, as previously described. The remote control of FIG. 2 may be used to reset the protection circuit without disconnecting the receiver from the AC line source. Transistor 132 is in parallel with SCR 131. Therefore, conduction of transistor 132 shunts current away from SCR 131 through transistor 132. If the protection circuit trips inadvertently, exercising the remote control to turn the receiver "OFF" will cause transistor 132 to conduct, thereby shunting anode current away from SCR 131. SCR 131 therefore turns off, resetting the protection circuit. Turning the receiver back on with the remote control will return the receiver to normal operation, in the absence of any actual fault conditions.

The receivers in both FIGS. 1 and 2 therefore utilize a common receiver disabling mechanism and both allow the remote control to reset the receiver protection circuit without unplugging the receiver.

The following are representative component values for the circuits of FIGS. 1 and 2.

| Resistor 50 | 100 Ω | Resistor 140 | 10 KΩ |
|---|---|---|---|
| Resistor 51 | 2200 Ω | Resistor 141 | 56 KΩ |
| Resistor 55 | 1000 Ω | Resistor 142 | 1000 Ω |
| Resistor 59 | 3900 Ω | Resistor 144 | 330 KΩ |
| Resistor 62 | 47 KΩ | Resistor 148 | 4.7 KΩ |
| Resistor 67 | 4700 Ω | Resistor 150 | 27 KΩ |
| Resistor 69 | 19.6 KΩ | Resistor 151 | 510 Ω |
| Resistor 75 | 6200 Ω | Capacitor 43 | 330 pF |
| Resistor 82 | 100 KΩ | Capacitor 53 | .1 μF |
| Resistor 91 | 390 KΩ | Capacitor 74 | 3900 pF |
| Resistor 92 | 4300 Ω | Capacitor 80 | .01 μF |
| Resistor 97 | 100 Ω | Capacitor 81 | .1 μF |
| Resistor 104 | 5600 Ω | Capacitor 96 | 0.033 μF |
| Resistor 105 | 56 KΩ | Capacitor 106 | 33 μF |
| Resistor 107 | 680 Ω | Capacitor 137 | .1 μF |
| Resistor 108 | 150 KΩ | Capacitor 147 | 22 μF |
| Resistor 111 | 130 KΩ | Inductor 73 | 100 μH |
| Resistor 112 | 8200 Ω | Zener diode 61 | 33 v. |
| Resistor 119 | .39 Ω | Zener diode 145 | 24 v. |
| Resistor 124 | 33 KΩ | $V_1$ | 150 v. |
| Resistor 128 | 10 KΩ | $V_2$ | 120 v. |
| Resistor 130 | 560 Ω | $V_3$ | 26 v. |
| Resistor 134 | 2.2 KΩ | $V_4$ | 27 Kv. |
| Resistor 135 | 100 Ω | | |

What is claimed is:

1. A television receiver disabling means comprising:
   means for disabling a television receiver when said disabling means is energized;
   means for detecting a receiver fault condition;
   first means coupled to said fault detecting means for energizing said disabling means in the presence of a detected receiver fault condition, said first means incorporating a latch for maintaining said disabling means energized when said latch is set;
   means for providing user activated receiver on and off command signals;
   second means coupled to said disabling means and responsive to said receiver off command signals for energizing said disabling means in order to disable said television receiver, said second means incorporating means coupled to said first means for resetting said latch in response to one of said command signals when said latch is set.

2. The arrangement defined in claim 1, wherein said resetting means comprises means for shunting current away from said latch.

3. The arrangement defined in claim 1 wherein said latch comprises first and second regeneratively-coupled transistors, said transistors becoming conductive in response to said receiver fault condition in order to set said latch.

4. The arrangement defined in claim 3 wherein said resetting means comprises means for reverse biasing one of said first and second transistors in order to reset said latch.

5. The arrangement defined in claim 4 wherein said means for reverse biasing one of said transistors comprises a capacitor and a switch coupled to said capacitor, responsive to said one command signal for applying the voltage across said capacitor to said one transistor in order to reverse bias said one transistor.

6. The arrangement defined in claim 1, wherein said means for providing said on and off command signals comprises means for providing remote control of said receiver.

7. The arrangement defined in claim 1 wherein said one command signal comprises said off command signal.

8. The arrangement defined in claim 1 wherein said second means is responsive to said on command signal for deenergizing said disabling means.

9. The arrangement defined in claim 1 wherein said off command signal is operative for setting said latch in order to disable said receiver.

10. The arrangement defined in claim 1, wherein said on command signal is operative for resetting said latch in order to reenable said receiver.

11. The arrangement defined in claim 1, wherein said fault condition comprises an excessive high voltage level.

12. The arrangement defined in claim 1, wherein said fault condition comprises excessive electron beam current.

13. In a television receiver including fault condition detecting means and a latch means, having set and reset conditions, for turning said television receiver off while in said set condition in the presence of a detected fault condition; user activated means for turning said receiver off by an off command signal generated by said user activated means during operation in the absence of said detected fault condition comprising means coupled to said latch means and responsive to said receiver off command signal generated by said user activated means for placing said latch means in said set condition in order to turn said receiver off.

* * * * *

UNITED STATES PATENT AND TRADEMARK OFFICE
CERTIFICATE OF CORRECTION

PATENT NO. : 4,435,731
DATED : March 6, 1984
INVENTOR(S) : Ravadee Kliebphipat et al It is certified that error appears in the above-identified patent and that said Letters Patent is hereby corrected as shown below:

Column 7, line 50, delete "L".

Signed and Sealed this

Seventh Day of May 1985

[SEAL]

Attest:

DONALD J. QUIGG

Attesting Officer

Acting Commissioner of Patents and Trademarks